United States Patent [19]

Epstein

[11] 4,183,759
[45] Jan. 15, 1980

[54] HARDENABLE COMPOSITIONS

[75] Inventor: David Epstein, London, England

[73] Assignee: The White Sea and Baltic Company Limited, London, England

[21] Appl. No.: 892,801

[22] Filed: Apr. 3, 1978

Related U.S. Application Data

[63] Continuation-in-part of Ser. No. 675,274, Apr. 9, 1976, Pat. No. 4,106,944.

[30] Foreign Application Priority Data

Apr. 13, 1977 [GB] United Kingdom ............... 15239/77
Apr. 13, 1977 [GB] United Kingdom ............... 15240/77
Apr. 13, 1977 [GB] United Kingdom ............... 15241/77

[51] Int. Cl.$^2$ .............................................. B28B 7/34
[52] U.S. Cl. ............................... 106/38.2; 106/38.35; 164/43; 260/42; 260/29.6 S; 260/29.6 H
[58] Field of Search ................... 106/38.3, 38.35, 38.2; 164/43; 260/42, 29.6 S, 29.6 H, DIG. 40

[56] References Cited

U.S. PATENT DOCUMENTS 3,804,794  4/1974  Schmitt et al. ..................... 260/42.13
3,929,493  12/1975  Lee et al. ............................. 106/35

FOREIGN PATENT DOCUMENTS 1422337  1/1976  United Kingdom .

Primary Examiner—Lorenzo B. Hayes
Attorney, Agent, or Firm—Lawrence Rosen; E. Janet Berry

[57] ABSTRACT

Particulate refractory material is formed into a mould or core and bonded with a binder including a polymeric carboxylic acid, a particulate inorganic material that will react with this to form a cement, water, and one or more of tartaric acid, phosphoric acid and fused particulate magnesia.

14 Claims, No Drawings

HARDENABLE COMPOSITIONS

This application is a continuation in part of my application Ser. No. 675,274 filed Apr. 9, 1976, now U.S. Pat. No. 4,106,944.

The traditional surgical cements, such as the cements used as dental cements for providing a base and/or lining in a tooth cavity, have often been made by mixing together a zinc oxide powder and a buffered orthophosphoric acid solution immediately prior to use. In British Patent Specification No. 1,139,430 dental cements are described prepared by mixing together in particular proportions a particular grade of polyacrylic acid with zinc oxide. Zinc oxide can have mixed with it a small amount, 10% in an example, of other oxides such as magnesium oxide. In British Patent Specification No. 1,316,129 surgical cements are described formed by mixing together with polycarboxylic acid, such as polyacrylic acid, of particular molecular weight, with a fluoro aluminosilicate glass powder having particular proportions of silica, alumina and fluorine.

The products according to Patent Specification No. 1,316,129 have commonly become referred to as A.S.-P.A. cements and are of increasing importance commercially in surgical applications.

In surgical situations rapid hardening of the cement is essential and according to British Patent Specification No. 1,422,337 the hardening of cements such as those described in 1,316,129 and 1,139,430 can be accelerated by including up to 20%, based on the weight of polycarboxylic acid, of a chelating agent, preferably citric acid, tartaric acid or a metal chelate.

Metal casting is generally conducted using a foundry sand mould or core. This is made by forming a foundry sand by mixing an inert refractory particulate material, such as sand, with a small amount of a curable binder and then curing the system, preferably at low or room temperature. After casting the mould or core is destroyed. It is preferred that it shall be easy to shatter it and that the residue can easily be recovered for further use and/or dumped without creating a toxicological hazard. Of the two main types of binder system used at present the sodium silicate binders suffer from the disadvantage that the destruction of the mould can be difficult whilst the organic binders, such as synthetic resins based on furfuryl alcohol, urea, and/or phenol condensed with formaldehyde, catalysed with a strong acid, can give environmental hazards and require the use of materials of variable availability and high price.

It is essential that a foundry binder shall cure sufficiently slowly to permit shaping of the mix before curing starts, but sufficiently fast that once the mix is shaped curing is thereafter completed rapidly to give a product having high strength.

In British Patent Application No. 14822/75 a process is described in which a foundry mould or core is made by using as binder an organic polybasic acid and an ion leachable inorganic particulate reactive material, such as the inorganic materials described in British Patent Specifications Nos. 1,139,430 or 1,316,129. It was described therein that the organic polybasic acid could be for example tartaric acid or paratoluenesulphonic acid, a mixture of organic polybasic acids, and mixtures of organic polybasic acids with inorganic acids. The preferred polybasic acid described therein is a polymeric polyacid, preferably a homopolymer or copolymer of acrylic acid.

We have now surprisingly found that very beneficial results are obtained when particular mixtures of ingredients are used as the binder. In particular, a method according to the invention of making a foundry mould or core comprises shaping a mix of a particulate inert refractory material and a binder and allowing the mix to cure, and in this method the binder comprises (a) a water soluble acid component comprising a polymeric carboxylic acid, (b) an inorganic particulate reactive material that can react with the polymeric carboxylic acid by leaching of ions to form a cement, (c) water in an amount of below 5% the total weight of the mix and (d) at least one modifier selected from tartaric acid, phosphoric acid and particulate fused magnesia, the or each modifier being present in an amount of at least 25% by weight based on the weight of polymeric carboxylic acid.

In one method, at least 25% tartaric acid (by weight based on polymeric carboxylic acid) is included as modifier. This gives slower setting and improved properties of the final product. In another method, at least 25% phosphoric acid (by weight based on polymeric carboxylic acid) is included as modifier. This gives improved properties of the final product, especially improved strength. Preferably at least 25% of each of tartaric acid and phosphoric acid are included. In another method at least 25% fused particulate magnesia is included as modifier. This gives improved properties in the final product, especially hardness.

The particulate inert refractory material may be selected from any of the inorganic particulate materials conventionally used for making foundry moulds or cores, for example refractory oxides and silicates such as sand, zircon sand, chromite and crushed olivine rock.

The polymeric carboxylic acid used in the invention is preferably a homopolymer of acrylic acid although copolymers of it with other unsaturated carboxylic acids, for example itaconic acid, can be used if desired. Preferably it is substantially linear and has an average molecular weight from 1000 to 100,000 most preferably 10,000 to 100,000. The amount based on the total weight of the mix is generally 0.3 to 2% and based on the total acid component it is generally at least 10%, preferably 15 to 50% by weight. Normally the acid component consists of the polymeric carboxylic acid alone or with tartaric and/or phosphoric acid.

The inorganic particulate reactive material must be one that will form a cement by leaching of ions from it upon contact with the aqueous solution of polymeric carboxylic acid. Such inorganic materials are well known and are described in, for example, the aforementioned British Patent Specifications Nos. 1,139,430 and 1,316,129. Reference should be made to those specifications for a full description of suitable reactive materials. The preferred reactive materials comprise aluminsilicate glasses, most especially fluoro-aluminosilicate glasses for example, made by fusing mixtures of silica, alumina, cryolite and fluoride in the chosen proportions at temperatures above 950° C. Preferably all reactive inorganic particulate material used in the invention will pass through a 350 B.S. mesh, although glass in the form of fibres may be used if desired.

The surface hardness of the final product is improved when fused particulate magnesia is included as a modifier of the reactive inorganic material, especially when that material is an aluminosilicate glass, preferably a fluoroaluminosilicate glass, as described above. The amount is normally at least 50% by weight based on the polymeric carboxylic acid or 10 to 100%, most preferably 25 to 75%, especially 50 to 70% by weight based on the glass. If too much is used the cured product tends to be slightly thermoplastic during casting, while if too little is used the desired improvement in hardness is not obtained.

In order that an optimum rate of curing and improvement in results is obtained it is necessary to use a fused magnesia, as opposed to other forms of magnesia or other metal oxides. The fushion apparently results in a controlled deactivation of the magnesia. Suitable fused magnesia can be made by calcination of materials such as magnesium hydroxide, carbonate, sulphate, nitrate or chloride in one stage, or can be made by calcination to produce magnesium oxide which is then fused to deactivate it. The fusion, either in a single stage or two stage process, preferably comprises heating at a temperature of 800° to 1500° C., preferably 1200° to 1400° C., for 3 to 5 hours. The particle size of the fused magnesia should be from 5 to 50 microns, preferably less than 300 mesh.

When tartaric acid is used, either alone or with phosphoric acid, the amount is preferably at least 50% based on the weight of polymeric carboxylic acid and most preferably is from 100 to 400%, eg 150 to 250%, normally 200%. The amount based on the total weight of the mix is generally 0.3 to 2%, preferably 0.5 to 1.5%. It will be noted that the amount is very much more than the 20% maximum recommended in British Patent Specification No. 1,422,337. We find surprisingly that the inclusion of the large amount of tartaric acid leads to a number of advantages that could not have been predicted, for instance, by having a combination of polymeric carboxylic acid and tartaric acid it is possible to slow down the rate of curing in a manner which is highly advantageous for foundry purposes. In British Specification No. 1,422,337 the addition of a small amount of tartaric acid was proposed as a way of accelerating the setting of the cement. While accelerated rates of setting are desirable in dental cements, as described in that specification, in foundry processes it is necessary to control the rate of cure to permit thorough mixing of the very bulky mix and shaping of it into the desired mould or core before setting starts. British Specification No. 1422337 would have suggested that tartaric acid would make the mix set more quickly but in fact we find that the large amounts now proposed make it set more slowly.

Another surprising advantage of the inclusion of a large amount of tartaric acid is that water necessarily has to be included in the binder (generally as the aqueous solution of the polymeric carboxylic acid) and this has a tendency to remain within the cured mix, and this can become serious with very large moulds or cores. However the inclusion of tartaric acid seems to reduce or eliminate this problem in that the water in some way is fixed and evaporation of it during subsequent casting of the metal against the mould or core does not seem to cause such a problem.

Another advantage is that desirable improvement in the strength of the mould is obtained when tartaric acid is used.

When phosphoric acid is included, either alone or with tartaric acid, it is preferably included in an amount of at least 33% by weight based on the dry weight of polymeric carboxylic acid, generally 50 to 300% and most preferably 75 or 100% to 200%. The amount based on the total weight of the mix is preferably 0.3 to 2%, usually 0.4 to 0.8%. Surprisingly, we have found that the inclusion of phosphoric acid in this manner causes a very large increase in strength, which increase does not seem to be attainable by any other strong acid addition that we have tested.

The amount of water in the mix must be sufficient for the polymeric carboxylic acid to be in solution and can be introduced as solvent for one or more of the acids or as free water. The polymeric acid can be introduced into the mix either as the desired solution or as a powder, provided extra water is included. Generally the total amount of water included in the mix is sufficient for the polymeric carboxylic acid to be present as a solution of from 15 to 35%, preferably 20 to 30% by weight. Normally it is from 0.5 to 3% based on the total weight of the mix. The phosphoric acid is generally introduced in concentrated form, for example 85%. The tartaric acid may be introduced as powder or solution, but if solution the amount of water should be kept sufficiently low that the total amount of water is still within the preferred range quoted above. Usually the polycarboxylic acid is introduced as a solution and no other significant amount of water is added.

The amount of inorganic particulate reactive material and fused magnesia (if present) is preferably from 1 to 10%, most preferably about 1.2 to 3.5% based on the total weight of mix, or 800 to 200%, eg about 300%, based on the polymeric acid weight. The total amount of binder ingredients is generally from 2 to 20%, by weight of the mix, the remainder being the particulate inert refractory material.

The foundry mould or core is made in the invention by forming the mix by simple mixing, casting it into the desired shape while it retains its plastic properties (generally a period of from 10 to 30 minutes from the beginning of mixing), and then allowing it to cure. Generally it has acquired adequate green strength in 20–30 minutes but is then left to cure further for at least 24 hours before use. Metal may be cast in it in the normal manner and the mould or core shattered to remove the casting. A particular advantage of the binders of the invention is that the resultant waste foundry sand does not include any toxic ingredients and can be reclaimed, for example by incineration, or dumped without creating a toxicity hazard.

The following are some Examples of the invention.

EXAMPLES 1 TO 12.

In each of these a foundry mix was made using polyacrylic acid having molecular weight 27,000 introduced as a 25% solution in water, tartaric acid powder, 85% orthophosphoric acid sg 1.7. finely powdered fluoroaluminisilicate glass, which is in accordance with Specification No. 1,316,129 (e.g. the material Glass FLT which is supplied by Pilkington Brothers), in the amounts specified in Table 1 and sufficient Chelford 50 sand to bring the quantities up to 100. The ingredients were mixed together, standard compression specimens were then rammed and left in the laboratory for 24 hours. The compression figure necessary to break the samples was then measured. Naturally the highest possible compression figure is desirable. then measured. Naturally the highest possible compression figure is desirable.

TABLE 1

| Example No. | | 1 | 2 | 3 | 4 | 5 | 6 | 7 | 8 | 9 | 10 | 11 | 12 |
|---|---|---|---|---|---|---|---|---|---|---|---|---|---|
| Glass FLT | % | 4 | 4 | 4 | 4 | 5 | 5 | 5 | 5 | 5 | 5 | 4 | 4 |
| Polyacrylic acid solution | % | 4 | 4 | 2 | 4 | 4 | 4 | 4 | 3 | 3 | 3 | 3.6 | 3.6 |
| Tartaric acid | % | — | — | — | — | — | — | — | 1 | 1 | 1 | 0.4 | 0.4 |
| Phosphoric acid | % | — | 1 | 2 | 2 | — | 1 | 2 | — | 1 | 2 | — | 1.0 |
| Compression lb/sq. in | | 95 | 295 | 315 | 365 | 120 | 480 | 425 | 335 | 425 | 465 | 145 | 870 |

The results in Examples 1 and 2 show the massive increase in strength brought about by 1% phosphoric acid, whilst the results in Examples 5 to 7 show that there seems to be an optimum for the amount of phosphoric acid and above this the strength can decrease. Example 8 shows that there is a significant increase in strength by the use of tartaric acid alone, although Example 9 shows that the addition of phosphoric increased the strength still further. Examination and actual use of the moulds and cores made in Examples 8 to 12 showed that the inclusion of phosphoric acid slowed down the rate of curing substantially, so that the mix remained in the plastic state for 15–20 minutes, whereas in Examples 1 to 7 it was in the plastic state only for 5–10 minutes, which made it difficult to achieve complete mixing.

EXAMPLES 13 TO 23

The general process described for Examples 1 to 12 was repeated except that a different fluoroaluminosilicate glass was used, glass G 200 supplied by Pilkington Brothers, this being used in an amount of 4%, with 4% of a 25% solution of polyacrylic acid in water and various amounts of various acids. The compression strength of each of the resultant mixes is shown in Table II. TPX 6 is a commercial sulphonic acid catalyst sold for use in organic foundry binders.

TABLE II

| Example | Added Acid | Amount % | Compression strength lb/in² |
|---|---|---|---|
| 13 | none | — | 135 |
| 14 | 1.7 sg phosphoric acid | 0.5 | 385 |
| 15 | " | 1.0 | 405 |
| 16 | 77% sulphuric acid | 0.5 | 140 |
| 17 | " | 1.0 | 200 |
| 18 | para toluene sulphonic acid | 0.5 | 135 |
| 19 | " | 1.0 | 90 |
| 20 | concentrated hydrochloric acid | 0.5 | 90 |
| 21 | " | 1.0 | 70 |
| 22 | TPX6 | 0.5 | 60 |
| 23 | " | 1.0 | 135 |

This shows that most of the acids have no effect or weaken the compressive strength whilst phosphoric acids gives a massive improvement.

EXAMPLE 24

The general method of Example 1 was repeated except that the fluoroaluminosilicate glass used was glass MP 2 supplied by Pilkington Brothers, it was used in an amount of 1% by weight based on the weight of the mix, and the mix also included ½% by weight fused magnesia based on the weight of the mix, 8% of a 25% aqueous solution of polyacrylic acid and 1% tartaric acid and after mixing and shaping and allowing to cure the cup hardness was determined. The result was 1.5%. In a comparative test in which the fused magnesia was omitted the result was 5.0. In this test the hardness figure is the depth of a scratch test measured in tenths of mm made by a George Fisher instrument the lower the figure the harder being the sand. Thus this Example shows the improvement in hardness obtainable when fused magnesia is used.

EXAMPLE 25

The method of Example 1 was repeated using a mix of 95 parts sand, 1 part fluoroaluminosilicate glass, 0.5 parts particulate fused magnesia, 1 part tartaric acid, a solution of 0.5 parts polyacrylic acid in 1.5 parts water and, optionally 0.5 parts phosphoric acid.

I claim:

1. A method of making a foundry mould or core comprising shaping a mix of a particulate inert refractory material and a binder and allowing the mix to cure in which the binder comprises (a) a water soluble acid component comprising a polymeric carboxylic acid (b) an aluminosilicate glass reactive with the polymeric carboxylic acid to form a cement, (c) water in an amount of below 5% the total weight of the mix and (d) at least one modifier selected from the group consisting of tartaric acid and phosphoric acid, each modifier being present in an amount of at least 25% by weight based on the weight of polymeric carboxylic acid.

2. A method according to claim 1 in which the polymeric carboxylic acid is an acrylic acid polymer.

3. A method according to claim 1 in which the polymeric carboxylic acid is a homopolymer of acrylic acid.

4. A method according to claim 1 in which the binder includes tartaric acid in an amount of at least 50% by weight based on the weight of polycarboxylic acid.

5. A method according to claim 4 in which the amount of tartaric acid is 100 to 400%.

6. A method according to claim 1 in which the binder includes phosphoric acid in an amount of at least 33% by weight based on the weight of polycarboxylic acid.

7. A method according to claim 6 in which the amount of phosphoric acid is 50 to 300%.

8. A method according to claim 1 in which the binder includes both tartaric acid and phosphoric acid.

9. A method according to claim 1 in which the glass comprises a fluoroaluminosilicate glass.

10. A method according to claim 1 in which the binder includes particulate fused magnesia in an amount of 10 to 100% based on the weight of inorganic particulate reactive material.

11. A method according to claim 1 in which the amount of water is from 0.5 to 3%.

12. A method according to claim 1 in which the total amount of water included in the mix is sufficient to yield an aqueous solution of polymeric carboxylic acid containing 15 to 35% polymeric carboxylic acid.

13. In a hardenable foundry composition that can be formed into the shape of a foundry core or mould and hardened, comprising an inert particulate refractory material selected from refractory oxides and silicates and binder ingredients that react to form a cured binder that hardens the composition, the improvement which consists of the use as binder ingredients of a particulate aluminosilicate glass and an aqueous solution of a polymer of acrylic acid that will leach cations from the glass to form the reacted binders, and in which the amount of the said binder ingredients is from 1 to 10% by weight of the composition and in which the binder ingredients include also particulate fused magnesia in an amount of at least 50% by weight based on the weight of polymeric carboxylic acid.

14. In a hardenable foundry composition that can be formed into the shape of a foundry core or mould and hardened, comprising an inert particulate refractory material selected from refractory oxides and silicates and binder ingredients that react to form a cured binder that hardens the composition, the improvement which consists of the use as binder ingredients of a particulate aluminosilicate glass and an aqueous solution of a polymer of acrylic acid that will leach cations from the glass to form the reacted binder, and in which the amount of the said binder ingredients is from 1 to 10% by weight of the composition and in which the binder ingredients include also at least one modifier selected from the group consisting of tartaric acid and phosphoric acid, each modifier being present in an amount of at least 50% by weight based on the weight of polymeric carboxylic acid.

* * * * *